Apr. 24, 1923.                                                              1,453,215
                           C. L. VORESS ET AL
        METHOD OF VOLATILIZING, DISTILLING, OR SEPARATING ABSORBED VAPORS
                           Filed Feb. 18, 1922
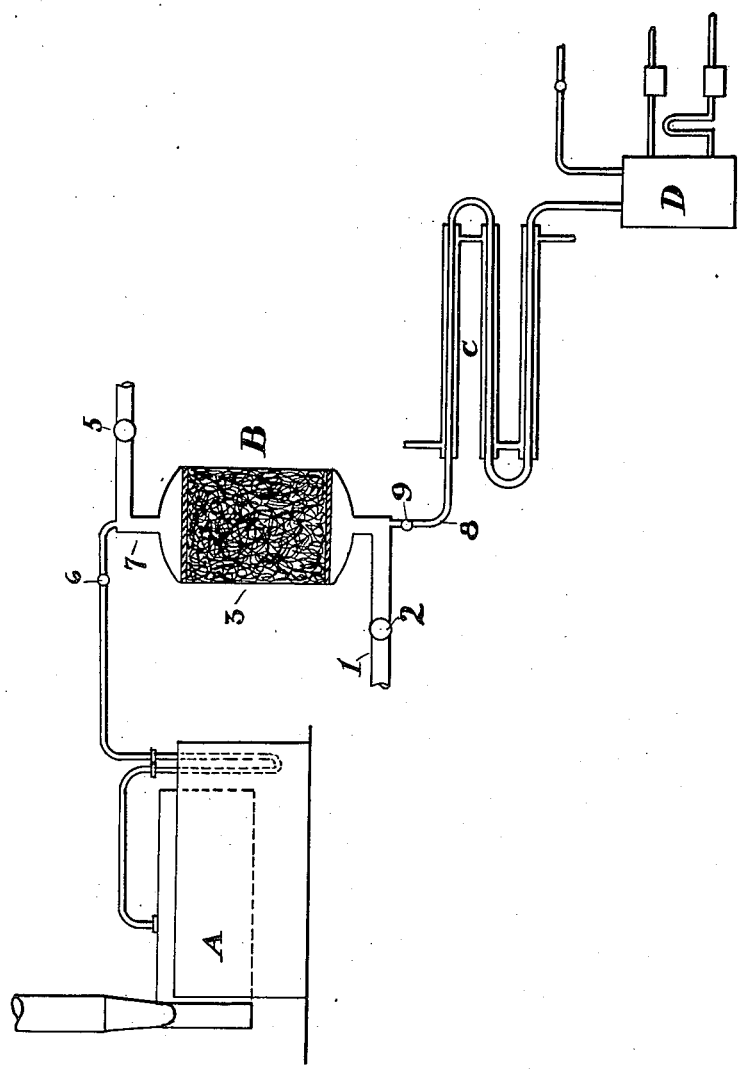

Patented Apr. 24, 1923.

1,453,215

UNITED STATES PATENT OFFICE.

CLYDE L. VORESS, OF NEW YORK, N. Y., AND VERNON C. CANTER, OF BRADFORD, PENNSYLVANIA, ASSIGNOR TO GASOLINE RECOVERY CORPORATION, A CORPORATION OF DELAWARE.

METHOD OF VOLATILIZING, DISTILLING, OR SEPARATING ABSORBED VAPORS.

Application filed February 18, 1922. Serial No. 537,570.

*To all whom it may concern:*

Be it known that we, CLYDE L. VORESS and VERNON C. CANTER, citizens of the United States, residing at New York, in the county of New York and State of New York, and at Bradford, county of McKean, and State of Pennsylvania, respectively, have invented certain new and useful Improvements in Methods of Volatilizing, Distilling, or Separating Absorbed Vapors; and we do hereby declare the following to be a full, clear, and exact description of the invention, such as will enable others skilled in the art to which it appertains to make and use the same.

This invention relates to an improved method of volatilizing, distilling or separating absorbed vapors of benzol (benzene), toluol (toluene), amylene, solvent naphtha (naphthalene), zylene or other vapors which have been absorbed from artificial gas, coke oven gas or other gas mixtures containing them from such solid absorbent mediums as activated charcoal, silica gel or iron gel in which they, or any of them, have been previously absorbed.

It relates further to the drying, cooling and re-activation of the activated charcoal, silica gel, iron gel or similar substances in preparing the medium to make or actually making further absorptions.

It relates more broadly to a complete cycle for recovering such vapors from gaseous mixtures containing them.

It is our intention that the term "absorbed" vapors as here used be applied to any such vapors held by the activated charcoal, silica gel, iron gel or similar substances either by "absorption" or "adsorption" as these terms are now understood, while the term "distillation" vapors is applied to any vapors introduced into the solid absorbent to distill the "absorbed" vapors therefrom.

Large quantities of gas used for fuel or chemical purposes are being produced each year from coal, wood or other substances of vegetable origin by destructive distillation, partial combustion or other chemical method, and from oil by numerous commercial processes. The majority of this is known as artificial gas to the industry. This gas before treatment to recover them may contain in varying quantities hydrocarbon derivatives such as benzols, toluols, zylenes, naphthalenes and many others, some coming under the aliphatic group but most of them under the aromatic classification. This invention applies to their recovery and separation from the artificial and coke oven gas, however, we make no claims for the recovery of any single one of the compounds in a chemically pure state where other compounds having boiling points within easy range are present. In the latter case all such compounds would be recovered together and other known methods for their rectification applied, if desired. The word "benzol" as used in the claims is used with this understanding: The recovered product may be utilized in the chemical industries or for motor fuel.

On December 9th, 1921, under Serial Number 521,232, the undersigned inventors have disclosed a similar process to be used in the recovery of a variety of vapors from gas mixtures and of gasoline vapors from natural gas in particular. This invention discloses other and more specific applications.

Prior to the present invention gaseous mixtures carrying recoverable vapors have been passed through solid absorbing mediums such as activated charcoal, silica gel, iron gel and the like, and the solid absorbents separated the vapors from the gaseous mixtures. Subsequently the absorbed vapors have been removed from the absorbent by introducing steam or other heated vapors into the absorbent for the purpose of distilling off the absorbed vapors, then the absorbed vapors and the distillation vapors were condensed and separated.

In the practice carried out prior to the present invention the steam, or other distillation vapor, is heated to a high temperature, generally over 200° C., and this superheated steam or vapor is passed through the absorbent for a sufficient period of time to remove not only the absorbed vapors but to also remove any condensed distillation vapors. This procedure while successful is disadvantageous owing to the large amount of distillation steam or vapor required to remove the condensed distillation vapors from the absorbent.

Prior to the present invention, the absorbent, after the steam, or other distillation vapor treatment, is in a very highly heated condition and in order to cool the same, gas has been passed through the absorbent. However, owing to the intensely heated state of the absorbent it was necessary to pass a large amount of the gas through the absorbent and to continue the passage of the gas for a considerable period of time.

We have recognized the disadvantages in the known process and have conceived a new method for rendering the recovery of valuable vapors commercially practicable. Therefore, the primary object of the present invention is to furnish a new method of separating valuable vapors from solid absorbents by the use of distillation vapors in a different manner from that which has heretofore been used.

Another object of the invention is to provide a method whereby distillation may be carried out more rapidly than heretofore.

Another object of the invention is to provide a method whereby distillation vapors may be quickly and more easily removed from the absorbent than by the method heretofore used.

Another object of the invention is to provide a method whereby distillation vapors may be quickly and more easily removed from the absorbent than by the method heretofore used.

Another object of the invention is to provide a cycle of displacements which may be easily and economically operated.

With the foregoing objects outlined and with other objects in view, which will appear as the description proceeds, the invention consists in the novel method hereinafter described in detail illustrated in the accompanying drawings and more particularly set forth in the appended claims.

The drawing shows a diagrammatic view of an apparatus which we have found suitable for carrying out the new process.

For the purpose of the present invention, the following description relates to the recovery of benzol and similar hydrocarbon vapors from artificial gas and the absorbent medium used is activated charcoal while the heating element, or distillation vapor, is steam.

Referring to the drawing, A is a steam generator and heating unit. B is a metal drum containing activated charcoal, C is a water cooled condenser and D is a separation tank.

By the present practice of operating the system, artificial gas containing the benzol vapor, to be recovered, is introduced through pipe 1 and valve 2, into absorber B where it passes upwardly through the charcoal, which absorbs and retains the major portion of the benzol and heavier hydrocarbon vapors. The denuded, or partially denuded, vapors leave the absorber by pipe 7 and valve 5. When a sufficient quantity of benzol vapor has been absorbed (this is usually fifteen to twenty per cent of the weight of the charcoal) steam from the heating unit A is introduced through valve 6 and pipe 7 into the charcoal 3 containing the absorbed vapors. As these vapors are evolved they pass out through pipe 8 and valve 9 into the condenser and from there into the separating tank.

At this time it may be stated that the temperature of the steam may be considerably lower than the temperature of the superheated steam heretofore used, but if the temperature of the steam is as high, or higher, than that heretofore used, the distillation may be more complete. At any rate we pass the steam through the absorbent for a sufficient time only to drive out the major portion of the vapors and to fill, or partially fill, the capillaries with the condensate formed from the steam. When the majority of the absorbed vapors have been distilled from the charcoal, valves 6 and 9 are immediately closed and at this time the charcoal will contain a large amount of condensate from the steam. It will be understood that all of the absorbed vapors have not been removed but a small percentage, 2% or more, remain in the capillaries of the charcoal with a large portion of condensate from the steam. The significance of this will be made apparent later. Then gas, from which the major portion of the benzol vapors have been removed in another charcoal absorber, is admitted through pipe 1 and valve 2 and it comes into intimate contact with the charcoal which contains the condensate from the steam. This gas passes out again by line 7 and valve 5. In the passage of the cooling gas through the charcoal two heat interchanges take place: One is the addition of heat due to the condensation of the light vapors, the other is the removal of heat due to the evaporation of water. In addition to these heat changes there is the actual cooling of the charcoal by the gas.

The entire process as described in this invention is a cycle of absorptions and displacements rather than absorptions and evacuations by heating. Starting with a body of charcoal saturated with absorbed vapors to be recovered the first displacement is that of the absorbed vapors by condensed steam. This takes place at a temperature much higher, relatively, than the ordinary absorption of the absorbed vapors. The absorbed vapors are not removed entirely from the capillaries but a small percentage of the heavier fractions remain. This displacement has been assisted by the latent heat of the condensed steam and the displaced absorbed vapors have been swept out by such steam vapors as have not condensed and by their own developed pressure. The second displacement is that of the condensed distilling vapors by light vapors from the cooling gas. Artificial gas, contains, after the majority of the benzol and the heavier vapors are removed, fractions which will condense in the charcoal capillaries at ordinary temperatures and pressures. As these are passed into intimate contact with the charcoal containing the condensed distilling vapors, the temperature of the charcoal is quickly reduced and the displacement of the distilling vapors takes place. Distillation is the reverse of absorption so that this displacement is brought about by causing the equilibrium between the distilling vapors and the cooling vapors to swing toward the cooling vapors by the addition of cool lighter vapors. It will be understood at this point that the displacement is assisted by the fact that the charcoal capillary always contains a small percentage of the heavier absorbed vapors which are not miscible with the condensed steam. This percentage of heavier absorbed vapors forms a film over the inner surface of the capillary and prevents the water from actually wetting the surface of the charcoal, thus leaving it in a condition more easily displaceable. The third displacement is that of the lighter vapors by the heavier vapors from the rich gas at ordinary temperatures and pressures. This is "selective absorption" as already described in the literature. Charcoal has a greater attraction for higher boiling hydrocarbon vapors than lower boiling hydrocarbons and will absorb the higher boiling hydrocarbons to displace the lower boiling hydrocarbons. It will be understood at this point that the absorption of the higher boiling vapors from the rich gas is made despite the fact that the charcoal already contains a small percentage of high boiling hydrocarbons left in from the previous distillation. The total percentage of higher boiling hydrocarbons remaining in the charcoal after each absorption compared with the volume of vapor recovered each absorption may be as high as 20% by volume. All other things being equal, this really assists the absorption of the lighter vapors by reducing the vapor pressure within the capillary. These three steps, or displacements, form a complete cycle for the extraction of such vapors from gas mixtures.

The steps of displacement of the steam by the lighter vapors and the displacement of the lighter vapors by the heavier hydrocarbon vapors may be combined, if desired so that the lighter vapors are displacing the steam and the heavier vapors displacing the lighter vapors in different parts of a body of charcoal at the same time.

Prior to the present invention it has been standard practice to introduce steam into the charcoal heated to betwen 200° and 500° C. When this steam first contacts with the cooler charged charcoal, condensation of a certain portion of the steam immediately took place and much of this moisture remained in the capillaries of the charcoal. The highly heated steam was passed through the charcoal for a comparatively great length of time so that it not only removed the absorbed vapors but it also removed the aqueous condensate. This prior practice is costly from two view points: namely, the volume of steam necessary for the distillation and the volume of denuded gas necessary for the cooling of the charcoal. Of the steam necessary for the distillation over 75% is used to drive out the steam condensed in the charcoal.

As before stated, we have discovered that if steam at 200° C., or less is passed into the absorber, a very large percentage of the absorbed hydrocarbon vapor is removed in a very short time but the capillaries of the charcoal remain filled with water vapor for a longer period than heretofore. The distillation is the result mainly of the capillary displacement of the hydrocarbon vapor by the distilling vapors in the presence of heat supplied mainly from the latent heat of the condensed steam.

We have discovered further that if only a small amount, less than 25% of the amount of steam formerly used, is passed into the charcoal and then relatively cool gas is immediately introduced into the charcoal the water vapors are in turn displaced by the vapors from the flowing gas and carried out of the charcoal, and this leaves the latter in a finely activated and relatively cool state. In addition to this, on account of the charcoal being relatively cool and containing a small percentage of high boiling benzol the ensuing absorption is more thorough and satisfactory.

We have found also that the volume of gas necessary to effect the cooling and displacement of the water vapor is not more than half the amount used for cooling by the former method. We have also found that the amount of steam can be reduced by our method so that less than 8 pounds of steam at 110° C., per gallon of benzol recovered is required.

In our explanation we do not wish to limit ourselves to the particular case or example given here as we have already applied the process to other substances and by other means than that specifically described and we are aware that our invention may be applied in other ways without departing from the spirit of the process as expressed in the claims.

For a treatise on "selective absorption" see Burrell, Oberfell and Voress—Chemical and Metallurgical Engineer, Jan. 26th, 1921—page 157.

What we claim and desire to secure by Letters Patent is:—

1. A process for the recovery of benzol vapors from gas mixtures by the method of absorption in activated charcoal, which consists in displacing benzol vapors from the charcoal by condensed distilling vapors at a temperature higher than the temperature at which the benzol was originally absorbed, then displacing the distilling vapors by lighter hydrocarbon vapors from substantially denuded gas at a temperature for the most part lower than that at which the benzol vapors were distilled from the charcoal, and then displacing the lighter hydrocarbon vapors by heavier benzol vapors from the gas mixture being denuded at a temperature lower than the temperature at which the previous displacement of benzol by the distilling vapors was made.

2. A process for the recovery, of benzol vapors from gas mixtures by the method of absorption in activated charcoal, which consists in displacing benzol vapors by condensed steam at a temperature approximating the boiling point of water, at the pressure prevalent, then displacing the condensed steam by lighter hydrocarbon vapors at a temperature for the most part substantially lower than the boiling point of water, and then displacing the lighter hydrocarbon vapors by heavier benzol vapors from the gas mixture being denuded at a temperature substantially less than the boiling point of water.

3. A method of separating benzol from activated charcoal consisting in passing distilling vapors into the benzol charged charcoal for a sufficient time only to displace the major portion of benzol and to deposit the portion of the condensates from the distillation vapors into said absorbent.

4. A method of separating benzol from activated charcoal consisting in passing steam into the benzol charged charcoal for a sufficient time only to displace the major portion of benzol and to deposit a portion of the condensate from the steam in said absorbent.

5. A method of separating benzol from activated charcoal consisting in passing steam into the benzol charged charcoal for a sufficient time only to displace the major portion of the benzol and to deposit a portion of the condensed steam in said charcoal at a temperature substantially that of boiling water.

6. A method of the kind defined in claim 4, having the added step of removing the condensed steam from the charcoal by introducing substantially denuded gas into the absorbent for displacing the condensed steam from the absorbent and for cooling the latter.

7. A method of the kind defined in claim 4, having the added step of displacing the condensed steam from the charcoal by introducing substantially denuded gas into the charcoal at a temperature for the most part substantially below the boiling point of water.

8. A method of continuously absorbing and separating benzol vapors in and from activated charcoal consisting in passing a gaseous mixture containing the benzol vapors to be recovered into said charcoal, then introducing distilling vapors into the charged charcoal for a sufficient time only to displace the benzol vapors and to deposit condensates from the distilling vapors in said absorbent, then introducing the gas previously contacted with charcoal through said absorbent for a sufficient time to displace the condensate of the distilling vapors with lighter vapors and subsequently introducing gas carrying vapors to be recovered into the charcoal which has been cooled by a previous gas passage.

9. A method of continuously absorbing and separating benzol vapors in and from charcoal consisting in passing the gaseous mixture containing the benzol vapors to be recovered into said charcoal, then introducing steam into the charged charcoal for a sufficient time only to displace the benzol and to deposit condensed steam in the charcoal, then introducing denuded artificial gas containing condensable fractions for a sufficient time to displace the condensed steam with the condensable vapors and subsequently introducing the gas mixture carrying the benzol vapors into the charcoal where the benzol vapors displace the lighter vapors.

10. A method of continuously absorbing and separating benzol vapors from active charcoal consisting in passing a gaseous mixture containing the benzol to be absorbed and separated into intimate contact with the charcoal, then introducing steam into the charcoal for a sufficient time to displace the first mentioned vapors from the capillaries with condensed steam, then introducing more of the gaseous mixture containing the benzol to be absorbed and separated to cool the absorbent and displace the steam from the capillaries at a temperature lower than that at which benzol vapors were previously displaced by the steam.

11. A method of the kind described in claim 10, in which two drums of charcoal are used alternately in such a manner that the charcoal in one is being contacted with the gaseous mixture containing the benzol while the charcoal in the other is being contacted with the steam for the displacement of the absorbed benzol.

12. In a process for the recovery, or removal, of benzol from artificial gas by the method of absorption in activated charcoal and the subsequent distillation of the vapors therefrom by steam, the step of passing the steam into intimate contact with the charged charcoal for a time only sufficient to volatilize the major portion of the benzol therefrom and the subsequent passing of artificial gas previously denuded of its heavier benzol vapors through said charcoal for the displacement of the condensed steam.

In testimony whereof we affix our signatures.

CYLDE L. VORESS.
VERNON C. CANTER.